June 3, 1969  H. S. BOTTOMS  3,447,778

VARIABLE FLOW METERING DEVICE

Filed April 6, 1966

United States Patent Office 3,447,778
Patented June 3, 1969

3,447,778
VARIABLE FLOW METERING DEVICE
Harry Simister Bottoms, Solihull, England, assignor to Joseph Lucas (Industries) Limited, Birmingham, England, a British company
Filed Apr. 6, 1966, Ser. No. 540,727
Int. Cl. F16k 39/00
U.S. Cl. 251—282                                 2 Claims

ABSTRACT OF THE DISCLOSURE

A variable flow metering device for fluids comprising a body part in which is mounted a fixed outer sleeve, a further outer sleeve co-axial with the fixed sleeve being axially movable within the body, an inner tube mounted co-axially with and in sliding engagement with the outer sleeve, the inner tube having in its wall at least one opening with diverging opposite edges, said opening being registerable with the space defined between adjacent ends of the outer sleeve, and the movable sleeve having at least one longitudinally extending passageway affording communication between the end thereof adjacent to the fixed outer sleeve, and a cavity defined between the end of the movable outer sleeve and the body part.

---

This invention relates to variable flow metering devices for fluids and of the kind comprising a pair of coaxial outer sleeves, one of which is fixed and the other of which is axially movable, and a coaxial inner tube in sliding engagement with both the outer sleeves, the inner tube having, in its wall, at least one opening having opposite edges diverging in an axial direction, the arrangement being such that the positions of the movable sleeve and the inner tube relative to the fixed sleeve, determine the axial length and circumferential width of the opening which is exposed for the flow of fluid therethrough.

It has been found in use, that there is a tendency for the flow of fluid to cause axial movement of the movable sleeve.

The invention has for its object to provide a device of the kind specified in a form in which this tendency is minimised.

In accordance with the present invention, a variable flow metering device of the kind specified is characterised in that a passageway is provided to afford communication between the opposite ends of the movable outer sleeve, through which fluid from the end nearer to the fixed sleeve can reach a cavity defined between the opposite end of the movable outer sleeve and a fixed body part of the device, and can be evacuated therefrom, the area of the end of the movable sleeve which is presented axially within this cavity being such that, in use, an unbalanced fluid pressure tending to act at the end of the movable sleeve nearer to the fixed sleeve is counterbalanced by fluid pressure acting on said area.

Figure 1:
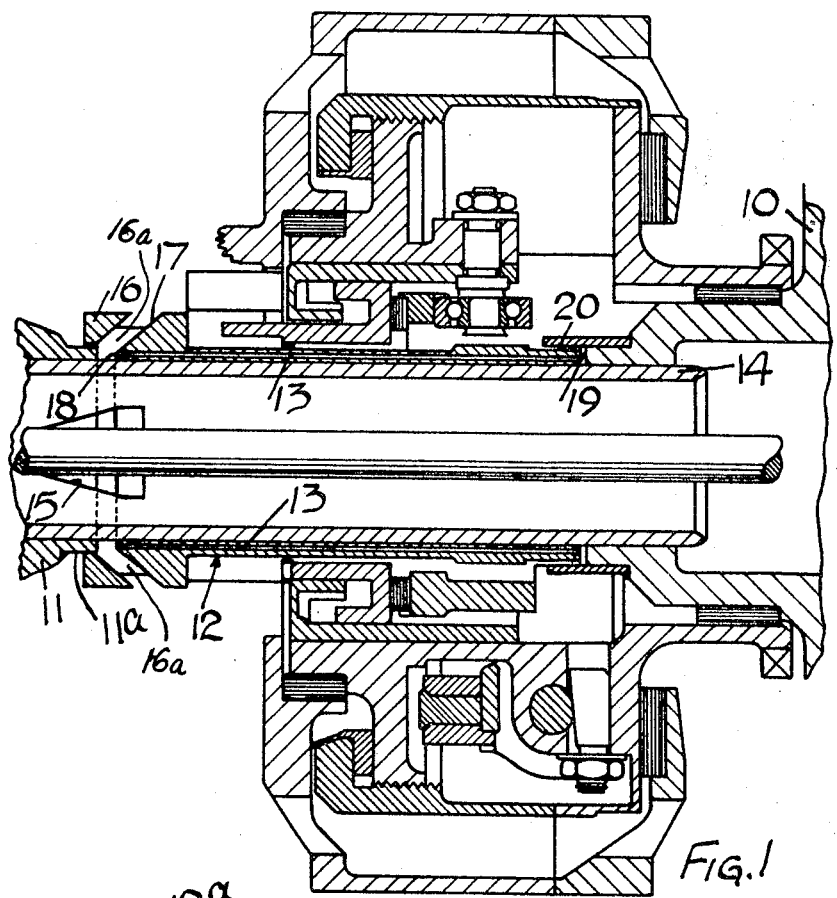
Figure 2:
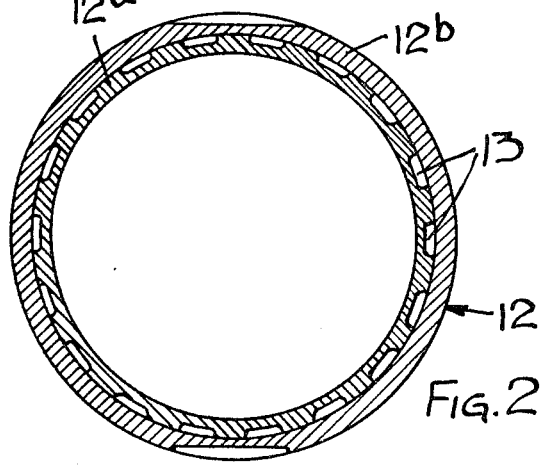

The invention will now be described by way of example with reference to the accompanying drawings in which FIGURE 1 is a cross-sectional view of a device incorporating the invention, and FIGURE 2 is an enlarged cross-sectional view of the movable outer sleeve of the device shown in FIGURE 1.

In the example of the invention shown a variable flow metering device, for use, for example in metering fuel to a gas turbine engine, is provided with a fixed body part 10. Mounted on this is a fixed outer sleeve 11, one end of which is stepped to provide a cylindrical portion 11a.

Mounted coaxially with the fixed sleeve 11 in the body part 10 is an axially movable outer sleeve 12 which is formed from two concentric sleeves 12a, 12b secured together as seen in FIGURE 2, the inner one 12a of which is formed with a plurality of angularly spaced longitudinal slots in its external surface which form passageways 13 affording communication between opposite ends of the sleeve 12. This sleeve 12 is movable axially relatively to the fixed sleeve 11 by a mechanism (not shown) which is controlled in accordance with changes in operating conditions existing within the associated engine.

Within the two outer sleeves 11, 12 is slidably mounted an inner tube 14 which, in addition to axial movement relatively to the outer sleeves, is also arranged in use, in a manner not shown, to be rotated so as to reduce frictional resistance to the axial movement. Axial movement of the inner tube is controlled by a device (not shown) which is responsive to changes in operating conditions existing within the associated engine. The inner tube 14 has, in its wall, at least one generally triangular opening 15 which can register with a space defined between the adjacent ends of the outer sleeves 11, 12 this opening 15 having diverging edges so that the axial position of the inner tube 14 and the relative positions of the fixed and movable outer sleeves 11, 12 determines the axial length and the circumferential width of the opening 15 which is exposed for the flow of fluid from outside the outer sleeves 11, 12 to the interior of the inner tube 14.

In this example the end of the movable outer sleeve 12 is nearer to the fixed outer sleeve 11 has an inclined annular passageway defined by a vane 16 secured to the end of the sleeve 12 and angularly spaced radial webs 16a, this being described in the specification of our copending U.S. patent application No. 490,956, Patent No. 3,310,939, the vane 16 overlapping the cylindrical portion 11a of the end of the fixed sleeve 11. This arrangement is intended to afford an inclined surface 17 against which the fluid flowing therethrough impinges to provide an axial component of force to counteract a tendency for axial movement of the movable sleeve 12 towards the fixed sleeve 11.

Fluid pressure forces on the movable sleeve 12 are therefore substantially balanced, except in so far that since the internal diameter of the vane 16 must be larger than that of the remainder of the movable sleeve 12, there remains an axially presented surface portion 18 of the movable sleeve 12 which is subjected to a fluid pressure tending to move the movable sleeve 12 towards the fixed sleeve 11.

To balance this relatively small fluid pressure, fluid obtained from that flowing through the device is permitted to occupy the longitudinal passageways 13 in the movable sleeve 12, and to reach a cavity 19 defined between the end of the movable sleeve 12, remote from the fixed sleeve 11, and the body part 10. Balance of pressures is achieved by making the area of the axially presented surface portion of the end of the movable sleeve 12 within the cavity 19 equal in size to that of the surface portion 18. The pressure in the cavity 19 may be varied by permitting a controlled bleed through a gap 20 defined between the movable sleeve 12 and the body part 10.

It will be understood that it is within the scope of this invention to omit the vane 16 and rely upon the pressure balance only to eliminate or minimise any tendency for axial movement of the movable sleeve 12. Furthermore, the passageways 13 for affording communication for fluid to the cavity can be provided in any other suitable manner such as by bores in the movable sleeve 12.

Having thus described my invention what I claim as new and desire to secure by Letters Patent is:

1. A variable flow metering device for fluids comprising a body part, a fixed outer sleeve mounted on said body part, a further outer sleeve movable axially within the body, said further outer sleeve being coaxial with the fixed outer sleeve, an inner tube mounted coaxially with and in sliding engagement with the fixed and movable outer sleeves, the inner tube having, in its wall, at least one opening having opposite edges diverging in an axial direction, said opening being registrable with a space defined between adjacent ends of the fixed and movable outer sleeves respectively, said movable outer sleeve having at least one longitudinally extending passageway, a cavity defined between the end of the movable outer sleeve remote from the fixed outer sleeve and the body, the passageway affording communication between the end of the movable outer sleeve adjacent to the fixed outer sleeve and the cavity.

2. A variable flow metering device as claimed in claim 1 in which the movable outer sleeve has a vane attached thereto at the end thereof adjacent to the fixed outer sleeve, to define a passage for the flow of fluid therebetween in a direction which is inclined to the axis of the movable outer sleeve.

References Cited

UNITED STATES PATENTS

| | | | |
|---|---|---|---|
| 2,141,428 | 12/1938 | Carroll | 251—208 X |
| 2,755,815 | 7/1956 | Erle | 251—282 X |
| 2,780,443 | 2/1957 | Holloway | 137—625.17 X |
| 2,925,242 | 2/1960 | Noon et al. | 251—282 X |
| 3,004,555 | 10/1961 | Haberland | 251—282 X |
| 3,009,480 | 11/1961 | Miller | 251—282 X |
| 3,094,306 | 6/1963 | Conrad | 251—282 |
| 3,123,335 | 3/1964 | Darling | 251—282 |
| 3,189,048 | 6/1965 | Parker et al. | 137—625.17 |
| 3,204,656 | 9/1965 | Moen | 251—282 X |
| 3,358,964 | 12/1967 | Cohen et al. | 251—282 X |

FOREIGN PATENTS 762,317  7/1967  Canada.

M. CARY NELSON, *Primary Examiner.*

R. C. MILLER, *Assistant Examiner.*